United States Patent [19]
Cook

[11] 3,936,908
[45] Feb. 10, 1976

[54] HIDE PULLING METHOD AND APPARATUS
[75] Inventor: Frank M. Cook, San Mateo, Calif.
[73] Assignee: The Cincinnati Butchers' Supply Company, Cincinnati, Ohio
[22] Filed: Apr. 2, 1975
[21] Appl. No.: 564,202

Related U.S. Application Data
[62] Division of Ser. No. 304,386, Nov. 2, 1972.

[52] U.S. Cl. .................................................... 17/21
[51] Int. Cl.² ........................................... A22B 5/16
[58] Field of Search .......................................... 17/21

[56] References Cited
UNITED STATES PATENTS
3,364,516  1/1968  White ..................................... 17/21

*Primary Examiner*—Robert Peshock
*Attorney, Agent, or Firm*—J. Warren Kinney, Jr.

[57] ABSTRACT

The invention involves pulling the hide mechanically from beef carcasses, in a manner such as to avoid hide and carcass damage without resorting to electric stimulus, and without the need for trimming knife labor in removing the hide effectively and advantageously from the skull of the carcass.

7 Claims, 2 Drawing Figures

HIDE PULLING METHOD AND APPARATUS

This is a division of application Ser. No. 304,386, filed Nov. 2, 1972.

BACKGROUND OF THE INVENTION

Various methods have been employed heretofore in mechanically pulling the hides from meat animals, as a step in the processing of meat on a rapid production basis. According to one method, as disclosed in U.S. Pat. No. 3,626,550, a carcass is suspended by the hind legs and mechanical means are provided for stripping a loosened hide from the hindquarters toward the head. In this patent, electric stimulus is employed to cause carcass muscle contraction, which is said to stiffen the carcass and facilitate progressive removal of the hide from the body and the skull as a continuous operation. A somewhat similar operation is disclosed in the U.S. Pat. No. 3,537,130.

The prior methods above mentioned have been employed both with and without the aid of electric stimulus, with varying degrees of success. In some forms of mechanical apparatus for hide removal, the hide stripping operation commenced at the skull and progressed toward the hindquarters. This usually entailed a preliminary burden of skillful hand knifing at the skull, as well as along the sides of the carcass, without decreasing the liklihood of damage to the hide, flesh, and spine of the carcass. Such devices usually pulled the hide laterally then upwardly toward the hindquarters of the suspended carcass, as disclosed in a general way by the drawings hereto appended.

SUMMARY OF THE INVENTION

In accordance with the present invention, the hides of a suspended carcass is slitted along the belly and throat of the carcass, whereupon the use of a "Jarvis" air knife or equivalent cutting or trimming implement, flaps of hide are produced at opposite sides of the carcass along substantally the full length thereof in accordance with common practice. The carcass, suspended from its hind legs, is conveyed to a hide puller which comprises a plurality of moving upstanding hooks which travel for a distance along a somewhat lateral course, away from the spine of the carcass, and then digress approximately vertically upwardly to an upper limit of travel well above the point of suspension of the carcass.

A yoke member preferably in the form of a chain, with opposite free ends and an intermediate anchor portion, is used for pulling the hide progressively from the skull and thereafter from the remainder of the carcass, as a selected hook of the hide puller advances the yoke member steadily from a lower or base position toward the upper limit of travel.

The opposite free ends of the yoke member are provided with flap grippers or loops, which securely grip opposite side flaps of the hide produced by an advance skinning of the forelegs and chest. The intermediate or anchor portion of the yoke member is adapted to engage a traveling hook of the hide puller, by the simple act of throwing the anchor portion over the upstanding end of the hook.

During advancement of the yoke member by a traveling hook as stated, the previously skinned forelegs of the animal are drawn away from said hook in a direction opposite to the direction of the initial hook advancement. This withdrawal of the forelegs tends to arch the neck and spine of the carcass over the shoulders and back, while the yoke member continues to advance and to eventually skin the skull clear of hide. Further advancement of the yoke member dehides the shoulders, back, and hindquarters progressively and usually without the need for any knife work.

It has been determined that the procedure above outlined dehides the carcass without damage to the spine, the hide, or the flesh of the carcass, and this is accomplished without the use of electric stimulus. It is believed that contraction of the spine, rather than elongation or stretching thereof, results from arching the spine as stated, during detachment of the hide therefrom. By eliminating or minimizing stretch, and possible tearing of tissue or muscle connecting the vertebrae of the spine, the present invention ensures the production of meat which will readily pass inspection and reach the market in palatable condition.

Additional advantages resulting from practice of the present invention are that one man can be eliminated at kill rates as low as 35 cattle per hour, and about one pound of additional head meat is left on the carcass.

Another pronounced and important advantage is that an improved hide take-off from the upper back occurs due to the inclination imparted to the carcass by the stanchion, or secondary puller.

DESCRIPTION OF THE PREFERRED EMBODIMENTS

Figure 1:
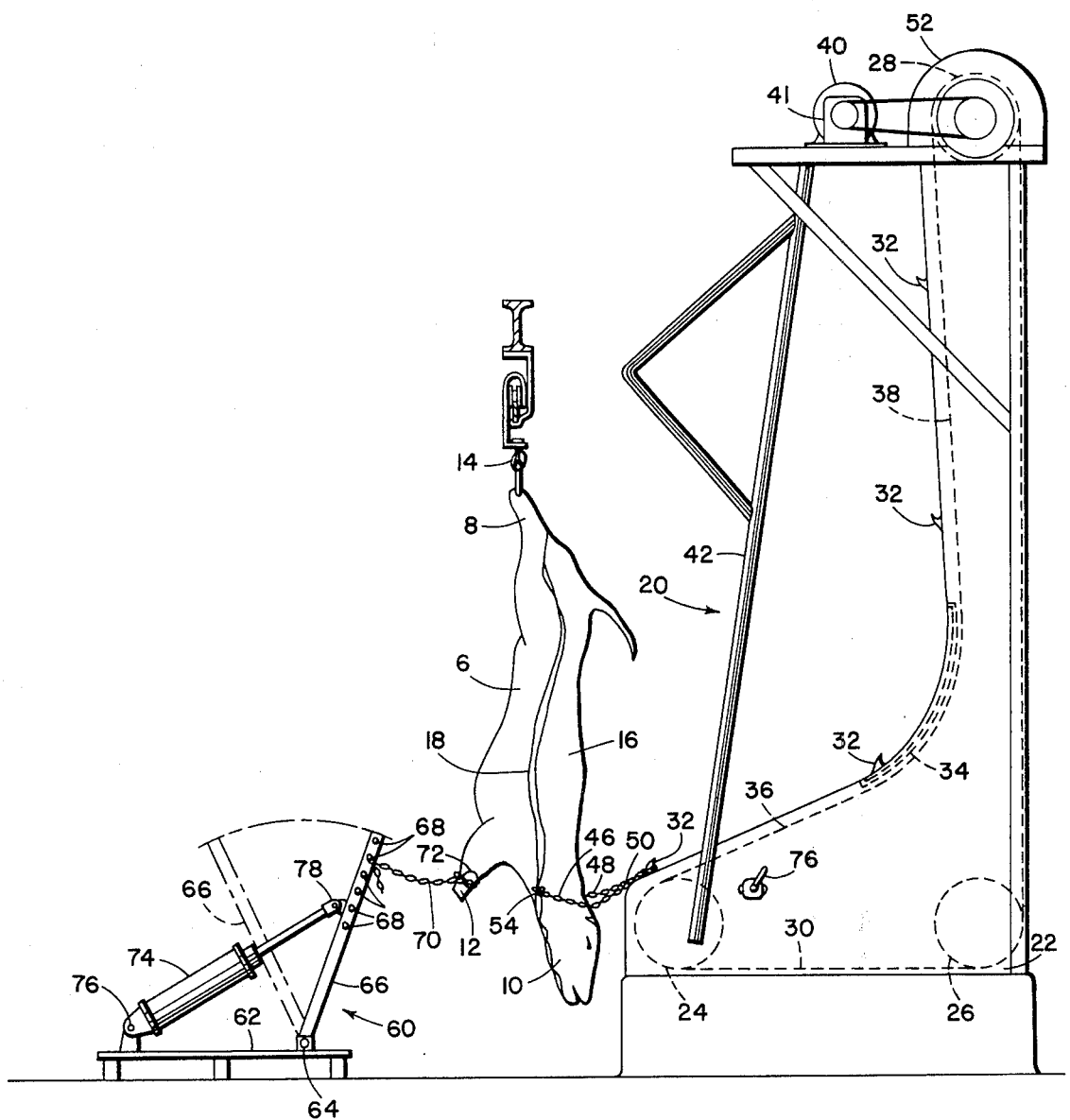
FIG. 1 is a side elevational view of a carcass suspended from a conveyor before an up-pulling hide puller, and showing a counterpuller in conjunction therewith, the components being illustrated in a condition free of stress.

As is usual, the meat processing plant includes a conveyor system from which a multiplicity of carcasses 6 are suspended by the hind legs 8. The head 10 and forelegs 12 are lowermost, as shown. The conveyor system, denoted generally by the reference numeral 14, may be conventional, and will serve to carry the carcasses successively into position for removal of the hide 16. Before reaching the hide remover or hide puller mechanism 20, the hide will have been slitted along the belly, and trimmed at the legs and shanks by means of a knife to provide flaps 18 at opposite sides of the carcass, the flaps extending from the region of the jawbones to the rear of the hind leg shanks, approximately.

A conventional hide puller denoted generally by the numeral 20 may comprise a heavy frame 22 in which is journaled a series of sprockets or wheels 24, 26, 28, over which is trained an endless chain or conveyor 30 that carries a plurality of outwardly extending hooks 32 equally spaced along the chain. A curved guide rail 34 mounted upon the machine frame, guides the chain to provide a substantially lateral section or reach 36, and an upwardly directed section or reach 38. The chain may be advanced upon the several sprockets by means of a motor 40 and speed reducer 41, or any suitable drive mechanism, in the direction of the arrow shown. The hooks of the chain reach an elevation considerably above the suspension point of carcass 6.

The reference numeral 42 indicates a guide means for control of the hide undergoing removal, and forms no part of the present invention.

At 44 is indicated a chain or equivalent flexible element, formed as a yoke having two hide gripper arms 46 and 48 divergent from an intermediate connecting portion 50. The free ends of arms 46 and 48 carry flap grippers to securely grip the foreleg hide flaps at 54. The connecting portion 50 is adapted to engage a hook such as 32 of the movable conveyor chain 30. The portion 50 may be referred to as an anchor portion of the yoke member. The anchor portion 50 is easily and quickly placed manually in engagement with a hook 32, where it will remain until the hide has been stripped from the carcass. The anchor portion disengages from the hook after the detached hide is drawn upwardly under a hood 52 and falls by gravity at the rear of the hide puller.

In accordance with the present invention, there is provided in conjunction with the up-pull type primary hide puller, a secondary or auxiliary puller or stanchion denoted generally by the numeral 60. Puller 60 operates to draw the previously skinned forelegs 12 in a direction substantially opposite to the pull initially exerted upon the hide by hook 32.

The secondary puller 60 comprises a base or fixed platform 62 upon which is pivoted at 64 an inclined stanchion 66, the stanchion being provided along a portion of its length with a series of studs or anchor members 68 located at different distances from pivot 64. Members 68 furnish means for anchoring a pair of pull chains 70, 70 to the stanchion, which chains at their opposite ends 72 are secured about the forelegs 12, one chain being attached to each foreleg. The attachments at 72 may be formed by loops in the chains, to facilitate and expedite securement and release of the leg connections.

The stanchion 66 may be swung about pivot 64 by power means, between the inoperative full line position of FIG. 1 and the operative broken line position thereof. One form of power means is shown by way of example, as a pneumatic cylinder motor 74 under the control of a valve 76 located preferably near the attendant's station at the primary hide puller. The pneumatic cylinder may have pivotal connections at 76, 78 with the platform 62 and stanchion 66, respectively, for proper operation.

As shown, the secondary puller appears to employ a single pneumatic cylinder operative upon a single upright stanchion member 66, which member 66 provides anchorage for two identical foreleg chains 70, one being attachable to each foreleg of the carcass. In practice, however, it may be desirable to construct the stanchion as a rigid open frame having two uprights, such as 66, arranged in a common plane, and movable in unison by two pneumatic cylinders each operative upon one of the uprights. The open frame may be rectangular in form. It is important, of course, that the two cylinders operate simultaneously to apply equal pulling forces to the two foreleg chains.

OPERATION OF THE DEVICE

The carcass 6 is prepared in advance of the hide removal operation, by slitting the hide lengthwise along the belly, and knife-trimming the hide from the forelegs, the hind legs and shanks, to form the longitudinal flaps 18 along opposite sides of the carcass. The head 10 is not to be skinned in advance, because the hide will be peeled from the head incident to the pulling procedure, with substantial advantage resulting.

The carcass prepared as stated, is conveyed head down, to the vicinity of the primary and secondary hide pullers, where an attendant attaches the skinned forelegs by means of chains 70 to the forwardly inclined stanchion 66, (see full lines 66 of FIG. 1); also, the yoke chains 46, 48 will be secured to the foreleg side flaps at 54 at opposite sides of the neck or shoulders. Then the attendant engages the intermediate anchor portion 50 of the yoke onto the nearest hook 32 of the primary hide puller. Hook 32 in advancing will exert an initial lateral pull upon the side flaps at 54, by way of chain sections 46 and 48. After said chain sections have reached a state of tension, the attendant may manipulate valve 76 to effect pneumatic withdrawal of stanchion 66 to or toward the operative position of FIG. 2.

Figure 2:
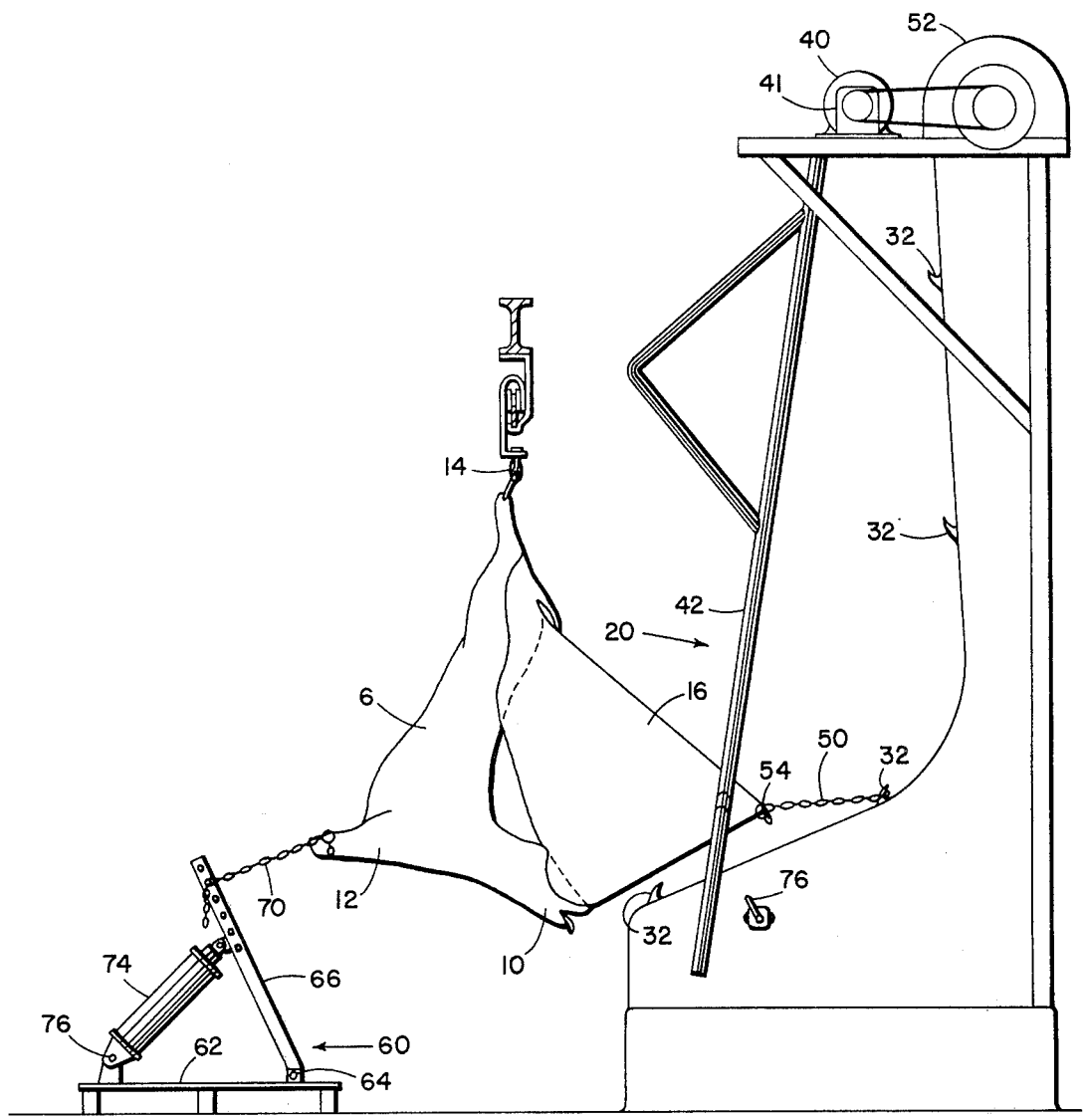
FIG. 2 is a side view similar to FIG. 1, showing the carcass undergoing dehiding in accordance with the teaching of the present invention.

As shown by FIG. 2, continued advancement of the operative hook 32 laterally, effects removal of hide from the shoulders and head 10, while the forelegs are drawn in the opposite direction by the secondary puller. Further advancement of hook 32, in upward direction, effects removal of hide completely from the back and rump, whereupon the attendant may manipulate valve 76 to restore stanchion 66 to the initial inoperative position, at which the chains 70 free of stress, may be detached from the forelegs of the carcass.

It is here to be noted that the counterforce imposed upon the forelegs of the carcass by the secondary puller 60, limits the extent to which the primary puller may contort the neck, head and vertebrae of the spine, as hook 32 proceeds toward and onto the upswing of its advancing movement. One important effect of said counterforce is evidenced by a clean and complete dehiding of the head, without the aid of the trimming knife. The head is cleanly dehided without objectionable tearing of flesh or fat therefrom. Accordingly, there is suffered no unnecessary loss of carcass weight, and the hide removed is found unusually clean and clear of unwanted flesh.

Another important accomplishment of the instant procedure, concerns the quality and appearance of the meat produced. Heretofore it was considered necessary to contract and stiffen the spine and surrounding muscles during dehiding, by applying electric stimulus or shock to the carcass, in order to preclude tearing, mutilation, and discoloration of the carcass meat as the hide was stripped therefrom. The present invention renders unnecessary the labor and expense of such electric stimulation, as the same results are realized by the proper application of pulling forces as herein taught.

It is believed that the opposing forces applied to the carcass by the primary and secondary hide pullers as herein taught, result in a controlled inward flexing (FIG. 2) of the spine which cramps and stiffens, rather than stretch the vertebral structure and its supporting muscles and tissues, so that these parts may not readily yield and tear apart under the stress of hide stripping.

Use of the method and apparatus herein disclosed minimizes the labor and expense of meat production, improves the quality and the appearance of meat produced, and results in the production of high quality unblemished hides on a major scale. By avoiding damage to the carcass in processing, this method facilitates and expedites inspection and passage in the application of health standards.

What is claimed is:

1. Apparatus for removing the hide from a meat carcass having the hide slitted lengthwise of the belly, the hide being partially detached from the carcass to provide side flaps disposed along opposite sides of the carcass, said apparatus comprising: a conveyor suspending the prepared carcass from at least one hind leg with the head and forelegs lowermost; a primary hide puller including means to grip the side flaps at opposite sides of the suspended carcass and forcibly pull the side flaps in a common direction toward and beyond the spine of the suspended carcass; and a secondary puller including means to grip the forelegs and forcibly pull said forelegs in a direction substantially opposite to the direction of pull applied to the side flaps by said primary hide puller.

2. Apparatus as defined by claim 1, wherein the direction of pull applied initially to the hide by the primary and secondary hide pullers, are lateral to the longitudinal axis of the suspended carcass.

3. Apparatus as defined by claim 2, wherein the primary hide puller includes means to change its direction of pull to one which substantially parallels the longitudinal axis of the suspended carcass.

4. Apparatus as defined by claim 1, wherein the gripping means of the primary hide puller is applied to the side flaps at locations proximate to the jawbones of the carcass head, to ensure pulling the hide from the head in advance of detachment of the hide from the back of the carcass.

5. Apparatus as defined by claim 1, wherein the foreleg pulling means of the secondary puller includes a stanchion movable toward and from the longitudinal axis of the suspended carcass, and flexible means for detachably connecting the forelegs to said movable stanchion; and means under the control of an attendant for so moving said stanchion.

6. Apparatus as defined by claim 5, wherein the means last mentioned is located upon the primary hide puller.

7. Apparatus as defined by claim 5, wherein the direction of pull applied initially to the hide by the primary and secondary hide pullers, are lateral to the longitudinal axis of the suspended carcass.

* * * * *